(12) United States Patent
Matos et al.

(10) Patent No.: US 10,907,799 B1
(45) Date of Patent: Feb. 2, 2021

(54) ADJUSTING LUMEN OUTPUT OF A LIGHT ASSEMBLY

(71) Applicant: International Business Machines Corporation, Armonk, NY (US)

(72) Inventors: Alex Matos, Rochester, MN (US); Kevin O'Connell, Rochester, MN (US); Brenda Berg, Rochester, MN (US); Janet Cederholm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/577,660

(22) Filed: Sep. 20, 2019

(51) Int. Cl.
  *F21V 14/08* (2006.01)
  *F21V 8/00* (2006.01)
  *F21V 9/14* (2006.01)
  *F21V 9/40* (2018.01)
  *F21Y 115/10* (2016.01)

(52) U.S. Cl.
  CPC ............... *F21V 14/08* (2013.01); *F21V 9/14* (2013.01); *F21V 9/40* (2018.02); *G02B 6/0008* (2013.01); *F21Y 2115/10* (2016.08)

(58) Field of Classification Search
  CPC .. F21V 14/08; F21V 2200/13; F21V 2200/40; F21V 9/14; F21V 9/40; G02B 6/0008
  See application file for complete search history.

(56) References Cited

U.S. PATENT DOCUMENTS

| | | | |
|---|---|---|---|
| 6,795,243 B1 | 9/2004 | McGettigan et al. | |
| 7,261,438 B2 | 8/2007 | Alessio | |
| 8,419,214 B2 | 4/2013 | Rizkin | |
| 9,562,671 B2 | 2/2017 | Davis | |
| 9,874,341 B2 | 1/2018 | Lim | |
| 2007/0109501 A1* | 5/2007 | Imade | G03B 21/20 353/31 |
| 2010/0033948 A1* | 2/2010 | Harbers | F21V 7/26 362/84 |
| 2010/0188018 A1* | 7/2010 | Salm | F21V 7/00 315/294 |
| 2013/0322115 A1* | 12/2013 | Parker | F21V 9/30 362/608 |
| 2014/0133142 A1* | 5/2014 | Jorgensen | F21S 10/02 362/231 |
| 2016/0290597 A1* | 10/2016 | Jurik | G02B 19/0066 |
| 2017/0075205 A1 | 3/2017 | Kriman | |

FOREIGN PATENT DOCUMENTS

| | | |
|---|---|---|
| CN | 101707052 A | 5/2010 |
| CN | 206222248 U | 6/2017 |
| CN | 207717222 U | 8/2018 |

\* cited by examiner

*Primary Examiner* — William N Harris

(74) *Attorney, Agent, or Firm* — Brian D. Welle

(57) ABSTRACT

Aspects of this disclosure relate to adjusting the lumen output of a light source. A system may include a light source, a pipe, and at least two light-obscuring elements within the pipe. The pipe may have an inlet port and an outlet port, where the inlet port is configured to be secured to the light source such that all lumens of the light source are directed through an inner passageway of the pipe to the outlet port. The light-obscuring elements may be configured to be moved to reduce a number of lumens of the light source that traverse through the pipe to the outlet port.

20 Claims, 5 Drawing Sheets

ADJUSTING LUMEN OUTPUT OF A LIGHT ASSEMBLY

BACKGROUND

Light-emitting diodes (LEDs) may be used in many applications. Some applications may include using them for various functions on circuits, e.g., as circuits to use on servers, where the LEDs communicate various statuses or the like. In some examples, it may be advantageous to have one or many LEDs outputting a predetermined number of lumens.

SUMMARY

Aspects of the present disclosure relate to systems and methods relating to adjusting a lumen output of a light source. For example, the system includes a light source, a pipe, and at least two light-obscuring elements within the pipe. The pipe may have an inlet port and an outlet port, where the inlet port is configured to be secured to the light source such that all lumens of the light source are directed through the pipe. The light-obscuring elements may be configured to be moved to reduce a number of lumens of the light source that traverse through the pipe to the outlet port. A method of an operator operating this assembly and a method by which this assembly functions are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
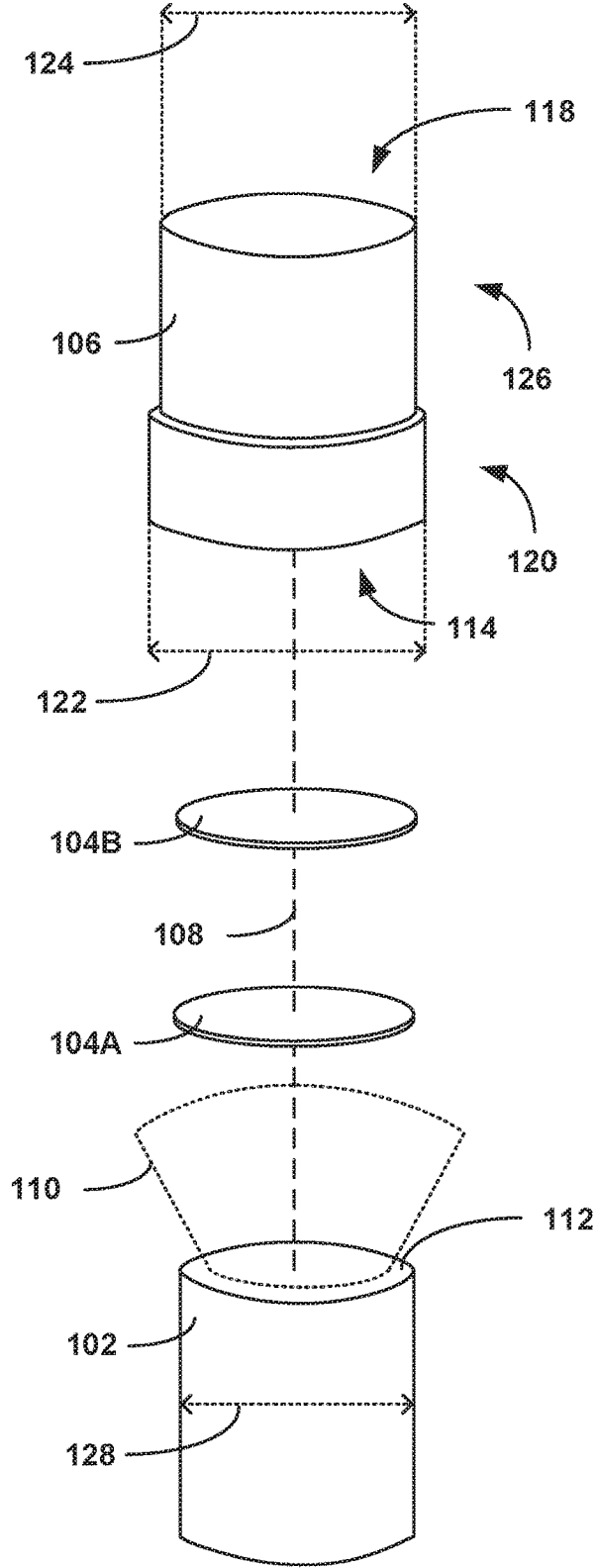
FIG. 1 depicts an exploded view of an example assembly that includes a light source, two light-obscuring elements, and a pipe.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to adjusting an amount of lumens output from an assembly, while more particular aspects of the present disclosure relate to using light-obscuring elements from a pipe secured to a light source to modulate a light output. While the present disclosure is not necessarily limited to such applications, various aspects of the disclosure may be appreciated through a discussion of various examples using this context.

Light sources such as light emitting diodes (LEDs) may be attached to circuit boards for many reasons, whether functional, aesthetic, informational, or the like. Conventional light source assemblies may have a structure similar to a tube or pipe that directs the light source in one or more directions. Due to manufacturing limitations, a lumen output of light sources may be less than 100% consistent across all manufactured lights. For example, a single type of light source as manufactured by a single manufacturer may be advertised to have a lumen output of 300 lumens, but in reality that light source may have a range of 290 lumen to 310 lumen, such that if a circuit board or the like includes an array of such light sources next to each other some light sources may appear significantly more dim. In some examples, a user may interpret an array of such conventional light sources with varying lumen outputs as indicating one or more defects, therein throwing out the assembly or sending the assembly back for repairs or the like.

As such, displays using such conventional light source assemblies may have a relatively unpredictable output and visual inconsistency. Depending upon the arrangement and design and nature of the light sources, it may be difficult or impossible to swap out the light sources to obtain a more consistent output. Further, while circuitry exists to allow dynamic adjustment of LED output, such circuitry is both more expensive, requires more space than some modern applications have to spare (e.g., such as on modern circuit boards), and may output more heat which may further require a relatively larger heat sink (which itself would take up more space).

Aspects of this disclosure may relate to assemblies and methods that may mitigate or eliminate these issues. For example, an assembly may include two or more light-obscuring elements that are configured to reduce a lumen output based on an alignment of the light-obscuring elements. The light-obscuring elements may be configured to be placed within a pipe that directs lumens of the light source. For example, the light-obscuring elements may be arranged and placed directly on top of the light source, after which the light pipe is placed over both the light-obscuring elements and the light source, such an alignment of the light-obscuring elements prior to the pipe receiving the light source may block some of the light. For another example, the light-obscuring elements may be integrated into the pipe, such that the light-obscuring elements may be moved via actuation elements to change an amount of light moving through the pipe subsequent to the pipe being secured to the light source.

The light-obscuring elements may include thin films or plates that extend across substantially all of the pipe. The pipe may include an interior passageway (e.g., such as a hollow cavity) through which lumens of the light source are directed. Alternatively, the pipe may instead be a solid transparent polymer that does not define an internal cavity, such that light extends through substantially all of the pipe. In some examples, each light-obscuring element individually may be configured to block little or no light. Rather, the light-obscuring elements may be configured to block some or most light only when the light-obscuring elements are arranged in a certain way relative to each other. For example, the light-obscuring elements may include some sections that are relatively transparent (e.g., such that these sections let light through at a relatively high rate) and other sections that are relatively non-transparent (e.g., such that these sections block light at a relatively high rate). In certain examples, the light-obscuring elements may include some sections that are relatively non-transparent and cut-outs (e.g., holes in the light-obscuring elements) through which light may traverse through. For another example, some sections of the light-obscuring elements may be polarized in opposite directions, such that aligning these opposite polarities with each other may block some or all of the light traversing through the pipe from an outlet port of the pipe. In this way, the light-obscuring elements may be moved (e.g., rotated within the pipe) such that, depending upon how the light-obscuring elements are aligned, more or less light is blocked by the light-obscuring elements as the light traverses through the pipe. Configuring these light assemblies to provide such a means for adjusting and/or homogenizing lumen outputs of a plurality of light assemblies subsequent to manufacturing may be substantially less expensive than manufacturing light sources that always provide the exact same lumen output.

For example, FIG. 1 depicts an example exploded view of an assembly 100 that includes light source 102, light-obscuring elements 104A, 104B (collectively, "light-obscuring elements 104"), and pipe 106. Light source 102, light-obscuring elements 104, and pipe 106 are depicted as exploded along longitudinal axis 108 of assembly 100. Though components of assembly 100 are depicted and discussed as being predominantly cylindrical, it is to be understood that one or more components of assembly 100 may define other shapes as well. For example, light source 102 and pipe 106 may be substantially cuboid, or any other shape that is consistent with this disclosure. Similarly, the relative size of components of assembly 100 are provided for purposes of illustration only. In other examples, some components may define substantially different sizes. For example, in some situations pipe 106 may be substantially smaller in overall volume or length in comparison to light source 102.

Light source 102 may output lumens 110 from light-emitting face 112 of light source 102. In some examples, light source 102 may be configured to output a single predetermined amount of lumens, and as manufactured (e.g., due to manufacturing tolerances or natural deviations in one or more materials) light source 102 may actually give out a range of lumens that includes the single predetermined amount of lumens. For example, light source 102 may be designed to output 20 lumens, and as manufactured light source 102 may output anywhere between 15 and 25 lumens. The amount of lumens output by light source 102 may be difficult or impossible to determine until light source 102 is activated (e.g., turned on) following manufacture. For example, light source 102 may be designed to output 20 lumens, though as manufactured light source 102 may output 25 lumens 110. As such, once light source 102 is secured to a final structure such as a circuit board or the like, it may be difficult or impossible to change the amount of lumens 110 output by light source 102 and/or to replace light source 102 with an alternative light source that may produce the desired amount of lumens.

Light-obscuring elements 104 may be configured to block some lumens 110 of light source 102. In this way, assembly 100 may, e.g., get the 25-lumen output down to the designed 20 lumen output or other desired output level. Light-obscuring elements 104 may be substantially the same size and/or shape of light emitting face 112 of light source 102 so that light-obscuring elements 104 may better cover or reduce lumens 110 of light source 102. In other examples, light-obscuring elements 104 may only be a predetermined ratio of the size of light-emitting face 112 of light source 102. For example, where it is predetermined that light-obscuring elements 104 are configured to block no more than a certain predetermined maximum percentage of lumens 110 of light source 102 (e.g., where light-obscuring elements 104 block between 0% and 25% of lumens 110 of light source 102), light-obscuring elements 104 may be a size that is configured to block that predetermined maximum percentage, even if light-obscuring elements 104 are fully aligned as described herein.

Pipe 106 may define an inlet port 114 that is configured to receive light-emitting face 112 of light source 102. From this inlet port 114, light traverses through pipe 106 to exit outlet port 118 of pipe. In some examples, pipe 106 may define a passageway which may include a hollow cavity of empty space that extends through an entire longitudinal length of pipe 106. In other examples, pipe 106 may be a solid component (e.g., such that pipe 106 does not define a cavity) constructed of a transparent material, such as a transparent polymer. Pipe 106 may be configured to be secured to light source 102. Pipe 106 may be secured to a light source 102 in a manner such that pipe 106 and light source 102 may be removed and secured together many times (e.g., functionally an infinite number of times) without damage to either light source 102 or pipe 106 (or light-obscuring elements 104). For example, an internal surface of pipe 106 and external surface of light surface 102 may both be threaded, such that pipe 106 and light source 102 may be threaded together to secure pipe 106 to light source 102. For another example, light source 102 and/or pipe 106 may define one or more interlocking components, such that pipe 106 and light source 102 may be locked together using these components. For another example, light source 102 may be configured to be received by pipe 106 with an interference fit, such that light source 102 is securely wedged into an inlet port 114 of pipe 106. In some examples, light source 102 and pipe 106 may utilize two or more of such means to securely receive each other.

In other examples, light source 102 and pipe 106 may be secured together in a pseudo-permanent fashion. For example, light source 102 and pipe 106 may be secured together via one or more of an adhesive, heat bonding, welding, soldering, or the like. In some examples, pipe 106 and light source 102 may be temporarily secured together (e.g., via an interference fit) to ensure that assembly 100 is operating as intended (e.g., that an amount of exiting lumens that exit from outlet port 118 is an intended amount), after which pipe 106 and light source 102 may be secured together in a pseudo-permanent fashion similar to the manners described above.

As described above, light-obscuring elements 104 may block an amount of light traversing through pipe 106. Light-obscuring elements 104 may block light via an array of transparent and non-transparent sections of light-obscuring elements 104, such as a radial array or a checkered array or different types of arrays. Additionally, or alternatively, light-obscuring elements 104 may include sections of different polarity (e.g., such that each section is transparent on their own, but if aligned with a section of a different polarity that the alternate polarity blocks some or all light along that overlapping portion).

Assembly 100 may be configured to secure light-obscuring elements 104 within pipe 106 such that light-obscuring elements 104 are held stationary relative to each other (e.g., such that none of light-obscuring elements 104 can rotate relative to the other(s) of light-obscuring elements 104). For example, one or both light-obscuring elements 104 may include an adhesive coating. In some examples, light-obscuring elements 104 may include a film over this adhesive coating, such that all light-obscuring elements 104 may be moved relative to each other to identify a desired alignment prior to securing light-obscuring elements 104 by removing this film. In such examples, light-obscuring elements 104 may be secured to light-emitting face 112, pipe 106, and/or each other. Light-obscuring elements 104 may be secured once light-obscuring elements 104 are properly aligned as described herein. Securing light-obscuring elements 104 may include radially securing one or both light-obscuring elements 104 to each other.

Additionally, or alternatively, light-obscuring elements 104 may be secured radially relative to each other via a press fit between light source 102 and pipe 106. For example, light-obscuring elements 104 may be placed between light-emitting face 112 and pipe 106. Pipe 106 may define first section 120 with first diameter 122 that is slightly larger than second diameter 124 of second section 126. Where assembly 100 is for an application such as a circuit board, both first and second diameters 124 may be small, between two and ten millimeters in diameter. First section 120 may define inlet port 114, and second section 126 defines outlet port 118. Second diameter 124 may be substantially similar to diameter 128 of light source 102. First section 120 may receive light source 102 such that light-emitting face 112 presses against an inner lip of second section 126. In some examples, first section 120 may receive light source 102 such that light emitting face 112 may press both light-obscuring elements 104 against the inner lip of second section 126, holding light-obscuring elements 104 in a single arrangement relative to each other.

In certain examples, one or both of light-obscuring elements 104 may be into or otherwise be a part of pipe 106. For example, light-obscuring element 104B may be substantially permanently secured to inlet port 114 of pipe 106, such that light-obscuring element 104A is moved relative to stationary light-obscuring element 104A to adjust an exiting number of lumens of assembly 100. In other examples, some part of one or both of light-obscuring elements 104 may be etched into pipe 106 (and/or light source 102).

Figure 2:
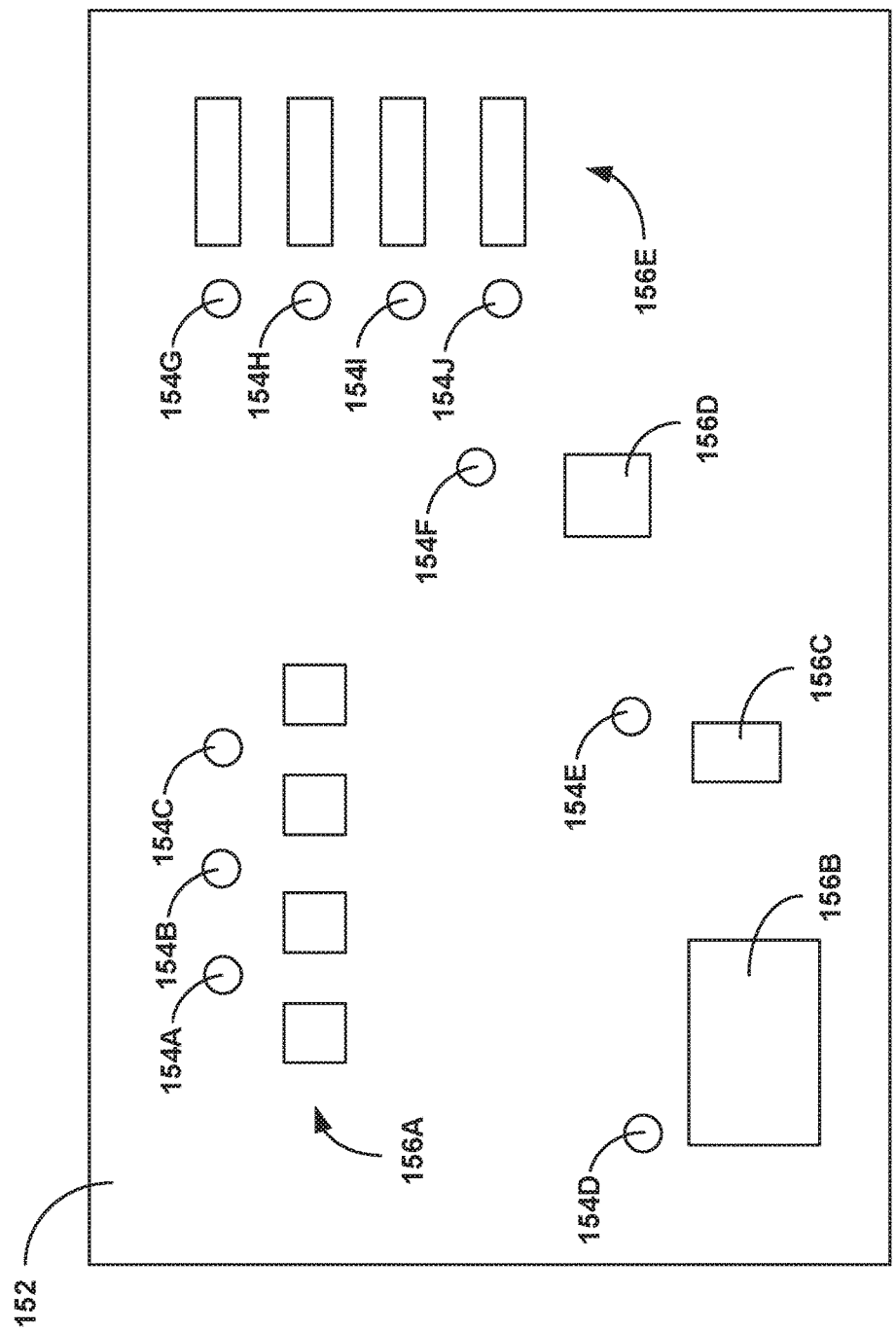
FIG. 2 depicts a top-down conceptual view of an example circuit that includes a plurality of circuit components and a plurality of light assemblies.

As discussed, assembly 100 may be among a plurality of similar assemblies, where all light-obscuring elements 104 are aligned to make sure that each respective assembly 100 outputs a similar respective number of lumens. For example, FIG. 2 depicts a top-down conceptual view of circuit 150 that includes circuit board 152 to which a plurality of light assemblies 154A 154J and a plurality of circuit components 156A-156E are secured. Each light assembly 154 may be substantially similar to assembly 100 with the exception of any differences described herein. It is to be understood that the specific location and relative side of light assemblies 154 and circuit components 156 as depicted in FIG. 2 is presented for purposes of illustration only, as light assemblies 154 and circuit components 156 may define any size and/or relative configuration that is consistent with this disclosure.

Circuit components 156 may include such components as power sources, resistors, transistors, capacitors, inductors, diodes, or the like. Circuit components 156 and/or light assemblies 154 may be electrically coupled to each other via wires or traces (not depicted) upon or within circuit board 152. As depicted in FIG. 2, light assemblies 154 may be spread throughout circuit 150. A lumen output of each light assembly 154 may have been adjusted with respective light-obscuring elements such that all light assemblies 154 of circuit 150 output one or more predetermined lumen outputs. For example, light-obscuring elements of all light assemblies 154 may have been moved relative to each other such that all light assemblies 154 output essentially the exact same number of exiting lumens. Alternatively, a lumen output of each light assembly 154 may be adjusted to one or more different lumen outputs. For example, a first light assembly 154 adjacent a power source may be adjusted to output a relatively higher lumen output than other light assemblies 154 that are adjacent an array of transistors, as per the particular requirements of circuit 150.

Figure 3:
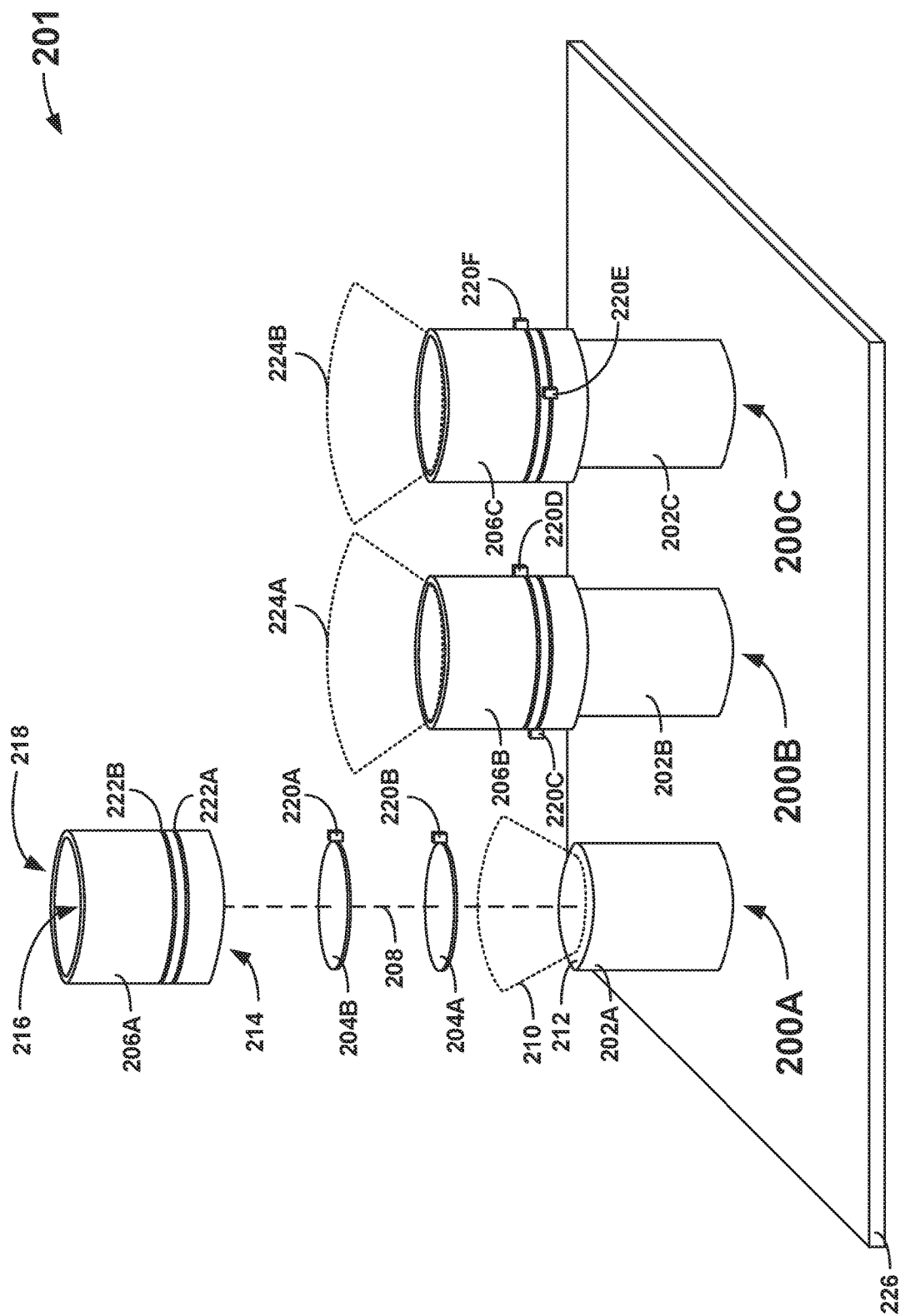
FIG. 3 depicts an example array of assemblies to be secured to a circuit board, each assembly including a pipe secured to a light source, including one exploded view of a light source and a pipe and two light-obscuring elements that are actuatable via actuation elements.

In some examples, a lumen output of respective light assemblies may be adjusted subsequent to securing a light pipe to the light source. For example, FIG. 3 depicts an array 201 of assemblies 200A-200C (collectively, "assemblies 200") that are each similar to assembly 100 with the exception of any differences described herein. Assemblies include light sources 202A-202C (collectively, "light sources 202") that are similar to light source 102 with the exception of any differences described herein which emit respective unique display of lumens 210. Array 201 includes first assembly 200A which is depicted in an exploded view, such that light-obscuring elements 204A, 204B (collectively, "light-obscuring elements 204") that are each similar to light-obscuring elements 104 with the exception of any differences described herein and pipe 206A which is similar to pipe 106 with the exception of any differences described herein are all exploded along longitudinal axis 208 of assembly 200A.

In some examples, one or more light-obscuring elements 204 may be moved subsequent to inlet port 214 of one of the respective pipes 206A-206C (collectively, "pipes 206") receiving a respective light source 202. For example, one or more actuation elements 220A-220F (collectively, "actuation elements 220") which are adjacent an outer surface of respective pipes 206 may be rotated around pipes 206 to move (e.g., rotate) a respective light-obscuring element 204. Actuation elements 220 may be secured to respective light-obscuring elements 204, such that moving respective actuation elements 220 immediately moves light-obscuring elements 204. For example, actuation elements 220 and light-obscuring elements 204 may be part of a unitary structure, or actuation elements 220 may be configured to slot into a hole of light-obscuring elements 204, or the like. In some examples, pipes 206 may define one or more slots 222A, 222B (collectively, "slots 222") in which actuation elements 220 may rotate around pipes 206 while engaging light-obscuring elements 204. While FIG. 3 is depicted with each assembly 200 having two light-obscuring elements 204 with respective actuation elements 220 in respective slots 222, in other examples each assembly 200 may include more than two light-obscuring elements 204. Alternatively, in some examples each assembly 200 may include only one light-obscuring element 204 that is moveable via a respective actuation element 220, such that any other light-obscuring elements 204 may be static within the respective assembly 200. Furthermore, although two light obscuring elements 204 are depicted in each assembly 200, it is to be understood that, in other embodiments, one or more than two light obscuring elements 204 can be included in each assembly 200. In addition, in some embodiments, one or more of the assemblies 200 may have a different number of light obscuring elements 204 than other assemblies 200.

Light-obscuring elements 204 of assemblies 200 may be arranged to change an exiting number of lumens 224A, 224B (collectively, "exiting number of lumens 224") that traverse cavities 216 of respective pipes 206 to exit respective outlet ports 218 of pipes 206. For example, light-obscuring elements 204 of assemblies may be moved to homogenize all exiting number of lumens 224 across an array 201 of assemblies 200. As depicted in FIG. 3, this array 201 may be on circuit board 226, which may include a further collection of circuit board components (e.g., a power source, resistors, transistors, capacitors, inductors) not depicted in FIG. 3 for purposes of clarity. Assemblies 200 of array 201 may be mixed in with these components, indicating statuses of and communicating information for these components.

In some examples, each assembly 200 of array 201 may be designed to output a predetermined amount, such as 25 lumens. However, as described herein, some light sources 202 as manufactured may output different numbers of lumens. For example, light source 202A may output twenty lumens 210. As such, light-obscuring elements 204 of assemblies 200B, 200C may be moved to reduce an amount of exiting lumens 224 to twenty lumens. For example, as depicted actuation element 220C is moved halfway around pipe 206B to reduce ten lumens such that assembly 200B outputs 20 exiting number of lumens 224A, while actuation element 220E is moved a quarter way around pipe 206B to reduce five lumens such that assembly 200C outputs 20 exiting number of lumens 224C. In this way, aspects of the disclosure may enable the homogenization of exiting lumens 224 of light sources 202 of an array 201 of light source assemblies 200 upon securing these light sources 202 to a final structure such as circuit board 226.

Figure 4A:
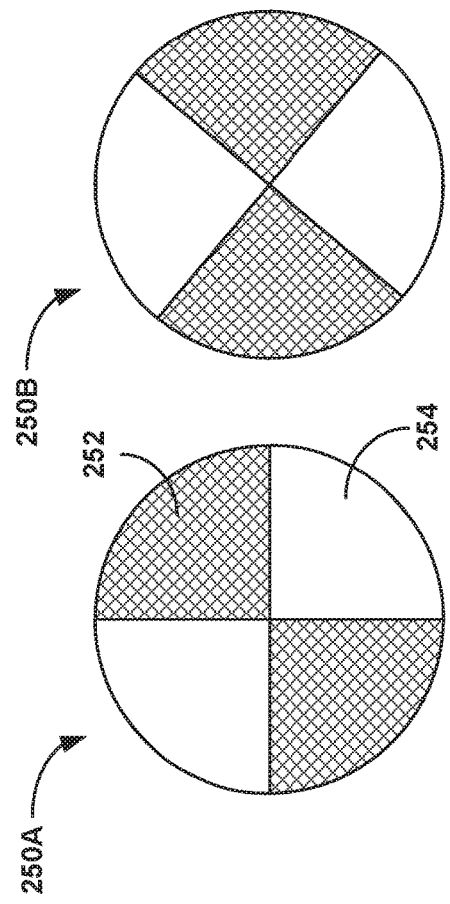
FIG. 4A depicts two example light-obscuring elements with radial patterns as arranged next to each other.
Figure 4B:
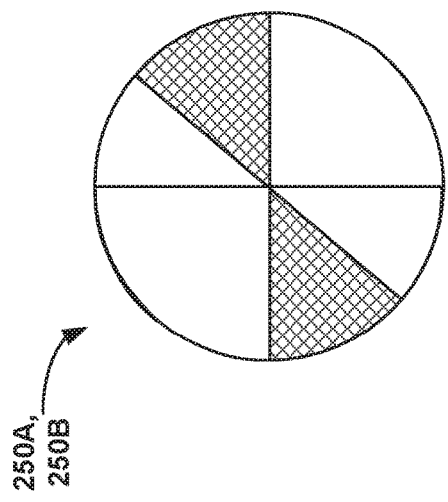
FIG. 4B depicts the two light-obscuring elements of FIG. 4A aligned on top of each other to block some light.

As discussed herein, light-obscuring elements may utilize a plurality of mechanisms to block light. For example, FIGS. 4A and 4B depict light-obscuring elements 250A, 250B (collectively, "light-obscuring elements 250") as depicted when misaligned side-by-side and when misaligned on top of each other, respectively. Light-obscuring elements 250 include transparent sections 252 and relatively non-transparent sections 254 as radial extensions that extend straight out from a center point of respective light-obscuring elements 250. Though both light-obscuring elements 250 are depicted with two transparent sections 252 and two non-transparent sections 254 of substantially equal size, light-obscuring elements 250 may include substantially any number of transparent and/or non-transparent sections 252, 254 at substantially any relative size. As depicted in FIG. 4B, light-obscuring elements 250 may be moved (e.g., rotated) relative to each other such that one non-transparent section 254 blocks at least some of one transparent section 252 along a longitudinal axis of an assembly. In this way, one or both light-obscuring elements 250 may be moved to reduce an amount of lumens that traverse an assembly and exit an outlet port of a pipe as an exiting number of lumens. Further, though as depicted light-obscuring elements 250 may obstruct 50% of a cross-section of a pipe as a default that can be increased by further un-aligning light-obscuring elements 250, in other examples light-obscuring elements 250 may have a minimum amount that is substantially below 50% of a cross-section of a respective pipe that is blocked.

Figure 5A:
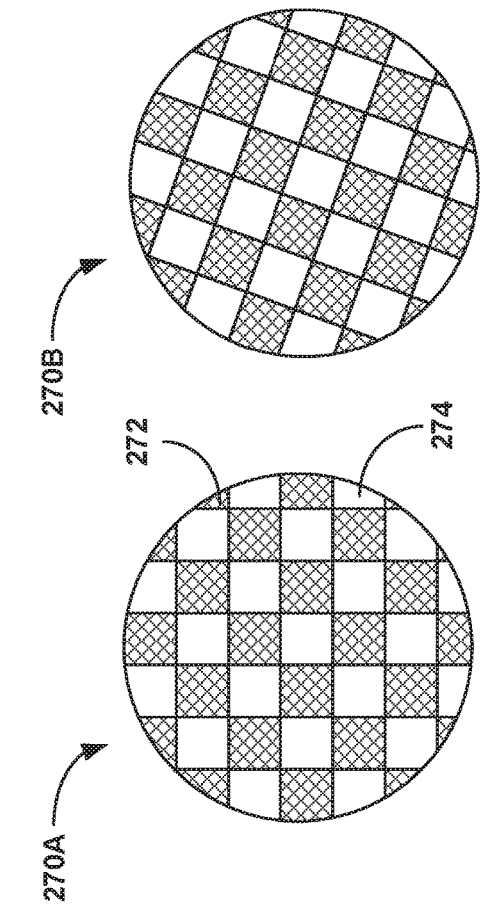
FIG. 5A depicts two example light-obscuring elements with a non-radial pattern arranged next to each other.
Figure 5B:
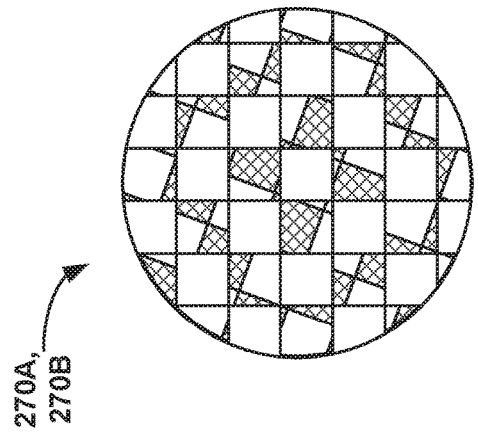
FIG. 5B depicts the two light-obscuring elements of FIG. 5A aligned on top of each other to block some light.

Transparent and non-transparent sections of respective light-obscuring elements may be substantially any shape or relative size. For example, FIGS. 5A and 5B depict light-obscuring elements 270A, 270B (collectively, "light-obscuring elements 270") as depicted when misaligned side-by-side and when misaligned on top of each other, respectively. Light-obscuring elements 270 include transparent sections 272 and relatively non-transparent sections 274 as a checkerboard pattern that extends across a respective face of respective light-obscuring elements 270. As depicted in FIG. 5B, light-obscuring elements 270 may be moved (e.g., rotated) relative to each other such that non-transparent sections 274 block portions of a plurality of transparent sections 272 along a longitudinal axis of an assembly. In this way, one or both light-obscuring elements 270 may be moved to reduce a number of lumens that traverse an assembly and exit an outlet port of a pipe as an exiting number of lumens.

Figure 6:
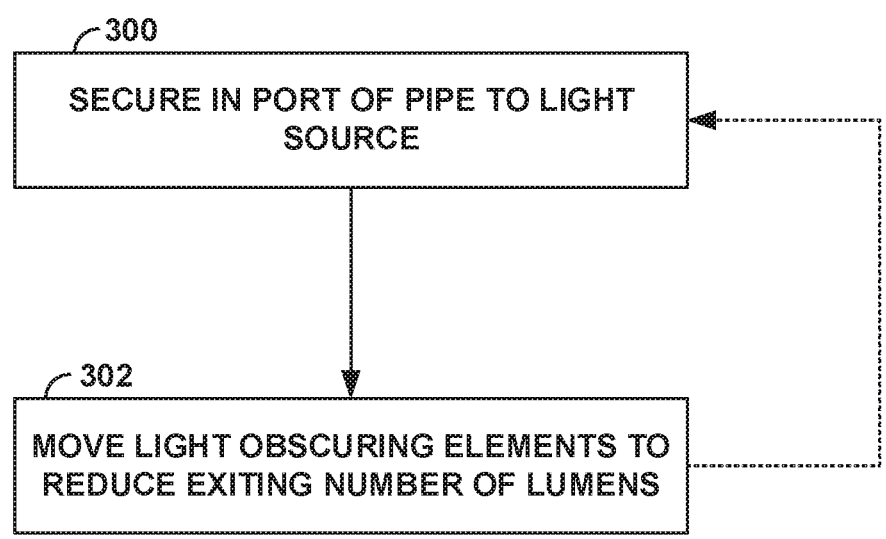
FIG. 6 depicts an example flowchart of an example method of reducing the lumen output of a light source.

Using these components, an operator may assemble structures with desired light output, regardless of imperfections in the light source manufacturing process. For example, an operator may assemble one or more light assemblies and an associated array according to the flowchart of FIG. 6. The flowchart of FIG. 6 is depicted with reference to FIG. 1, though it is to be understood that an operator may assemble light sources and resultant arrays according to the flowchart of FIG. 6 with other systems that are consistent with this disclosure. Further, an operator may assemble light sources and resultant arrays according to other methods than the flowchart depicted in FIG. 6 in other examples.

An operator may secure inlet port 114 of pipe 106 to light source 102 (300). Inlet port 114 may receive light source 102. For example, inlet port 114 may be threaded onto light source 102. Inlet port 114 may receive light source 102 such that light-obstructing elements 104 are within pipe 106 such that light-obstructing elements 104 extend across much or substantially all of pipe 106. Light-obstructing elements 104 may extend substantially perpendicular to longitudinal axis 108 of assembly 100. The operator may inspect an exiting number of lumens of the assembly 100. The operator may inspect this number as compared to an array of assemblies 100 (e.g., to look for consistency across each output). Alternatively, or additionally, the operator may measure this number using a tool against a predetermined number of lumens.

The operator may move one or more light-obscuring elements 104 to reduce an exiting number of lumens of assembly 100 (302). For example, the operator may rotate one or more of light-obstructing elements 104. The operator may rotate one or more light-obstructing elements 104 to align light-blocking elements of light-obstructing elements 104, such as non-transparent sections as depicted in FIGS. 4A-5B, or to align areas of different polarity, or the like.

In some examples, an operator may move one or more light-obstructing elements 104 while pipe 106 receives light source 102 (e.g., using actuation elements 220 of FIG. 3). In other examples, an operator may need to remove pipe 106 from one or more light sources 102 in order to move one or more light-obstructing elements 104. In such examples, the operator may remove (e.g., unscrew, unclip, or the like) pipe 106 from light source 102, after which the operator may again reattach pipe 106 and light source 102 (300) when light-obstructing elements 104 are moved (as indicated by the dotted line). In this way, an operator may move a plurality of light-obstructing elements 104 across an array of assemblies 100 of a circuit board or the like to homogenize or otherwise modify exiting number of lumens of these assemblies.

As such, as described herein, assemblies may alter an amount of light outputted by one or a plurality of light assemblies. For example, assemblies may alter an amount of light outputted. Pipe 106 may receive lumens 110 of light source 102 (which may occur resulting from operation 300 of FIG. 6). Inlet port 114 of pipe 106 may receive light source 102 into inlet port 114 of pipe 106. One or more light-obscuring elements 104 may block lumens 110 of light source 102 (such as moved in operation 302 of FIG. 6). Light-obstructing elements 104 may block lumens 110 of light source 102 via non-transparent sections as depicted in FIGS. 4A-5B, or via aligned areas of different polarity, or the like. Assembly 100 may be configured to block lumens 110 such that an exiting amount of lumens of assembly 100 is substantially similar to an exiting amount of lumens of adjacent assemblies or other desired value.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a light source;
   a pipe with an inlet port configured to be secured to the light source such that all lumens of the light source are directed through the pipe; and
   two light-obscuring elements within the pipe configured to be moved relative to each other to reduce a number of lumens of the light source that traverse through the pipe.

2. The system of claim 1, wherein the light source is a first light source and the pipe is a first pipe with a first inlet port and the two light-obscuring elements are a first set of two light-obscuring elements, the system further comprising:
   a second light source;
   a second pipe with a second inlet port configured to be secured to the second light source such that all lumens of the second light source are directed through the second pipe; and
   a second set of light-obscuring elements within the second pipe configured to be moved to reduce a number of lumens of the light source that traverse through the second pipe.

3. The system of claim 1, wherein the light source is a light-emitting diodes (LED).

4. The system of claim 1, wherein the pipe is between two and ten millimeters in diameter.

5. The system of claim 1, wherein;
   the light source is designed to output an exiting number of lumens and manufactured by a process that includes a manufacturing tolerance of outputting a plurality of lumens that includes the exiting number of lumens; and
   at least one of the two light-obscuring elements is moved to reduce a number of lumens of the light source that traverse through the pipe to an outlet port to the exiting number of lumens.

6. The system of claim 1, wherein the two light-obscuring elements comprise a first and second rotatable film that both extend across a cross-section of the pipe, wherein the number of lumens is reduced by rotating one of the first or second rotatable films relative to the other of the first or second rotatable films.

7. The system of claim 6, wherein the first rotatable film defines a first polarity, and the second rotatable film defines a second polarity.

8. The system of claim 6, wherein both the first and second rotatable film include transparent radial sections and non-transparent radial sections.

9. The system of claim 1, wherein the light source is secured to a circuit and lumens of the light source that emit from an outlet port are used by the circuit to indicate one or more statuses of the circuit.

10. The system of claim 1, further comprising an actuation element adjacent an outer surface of the pipe, the actuation element configured to move one or both of the light-obscuring elements once the pipe is secured to the light source.

11. The system of claim 1, wherein the two light-obscuring elements are configured to rest against a light-emitting face of the light source and be secured in place as a result of the pipe being secured to the light source.

12. The system of claim 1, wherein the pipe is a piece of transparent polymer that does not define an internal cavity.

13. A circuit comprising:
   a circuit board;
   a plurality of circuit components secured to the circuit board; and
   a plurality of light assemblies secured to the circuit board, wherein each light assembly of the plurality of light assemblies includes:
   a light source;
   a pipe with an inlet port configured to be secured to the light source such that all lumens of the light source are directed through the pipe; and
   two light-obscuring elements within the pipe configured to be moved relative to each other to reduce a number of lumens of the light source that traverse through the pipe.

14. The circuit of claim 13, wherein
   at least one light source of at least one light assembly of the plurality of light assemblies outputs a different number of lumens relative to another light source of another light assembly of the plurality of light assemblies; and
   respective light-obscuring elements of respective light assemblies of the plurality of light assemblies are moved relative to each other such that all light assemblies of the plurality of light assemblies output the same exiting number of lumens.

15. The circuit of claim 13, wherein each light source of the plurality of light assemblies is a light-emitting diode (LED).

16. The circuit of claim 13, wherein each pipe of the plurality of light assemblies is between two and ten millimeters in diameter.

17. The circuit of claim 13, wherein the two light-obscuring elements of each light assembly of the plurality of light assemblies comprise a first and second rotatable film that both extend across a cross-section of the pipe, wherein the number of lumens is reduced by rotating one of the first or second rotatable films relative to the other of the first or second rotatable films.

18. The circuit of claim 17, wherein the first rotatable film defines a first polarity, and the second rotatable film defines a second polarity.

19. The circuit of claim 17, wherein both the first and second rotatable film include transparent radial sections and non-transparent radial sections.

20. A system comprising:
- a light-emitting diode (LED) designed to output an exiting number of lumens and manufactured by a process that includes a manufacturing tolerance of outputting a plurality of lumens that includes the exiting number of lumens;
- a solid polymer pipe that defines a diameter between two and 10 millimeters with an inlet port configured to be secured to the LED such that all lumens of the LED are directed through the pipe; and
- a first and a second rotatable film that both extend across a cross-section of the pipe and are configured to be rotated relative to each other to reduce a number of lumens of the LED that traverse through the pipe to the exiting number of lumens.

\* \* \* \* \*